United States Patent
Satake et al.

(10) Patent No.: US 7,145,311 B2
(45) Date of Patent: Dec. 5, 2006

(54) VECTOR CONTROL DEVICE OF WINDING FIELD TYPE SYNCHRONOUS MACHINE

(75) Inventors: Akira Satake, Tokyo (JP); Atsuo Haishi, Tokyo (JP); Masaru Kobayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 15 days.

(21) Appl. No.: 11/091,395

(22) Filed: Mar. 29, 2005

(65) Prior Publication Data

US 2005/0212476 A1    Sep. 29, 2005

(30) Foreign Application Priority Data

Mar. 29, 2004   (JP)   ............. P2004-095815

(51) Int. Cl.
*H02P 1/46*   (2006.01)
(52) U.S. Cl. ............. 318/720; 318/700; 388/806; 388/805; 388/809
(58) Field of Classification Search ................ 318/720, 318/700; 388/806, 805, 809
See application file for complete search history.

(56) References Cited

U.S. PATENT DOCUMENTS 4,549,122 A * 10/1985 Berkopec et al. .......... 388/806
6,731,098 B1 * 5/2004 Hintz et al. ................ 322/44

FOREIGN PATENT DOCUMENTS

| JP | 05-030774 A | 2/1993 |
| JP | 08/331900 A | 12/1996 |
| JP | 2856950 B2 | 11/1998 |
| JP | 11-313498 A | 11/1999 |

OTHER PUBLICATIONS

"Vector Control of Synchronous Machine", Author: Hiroshi Osawa, at S. 8-19 in 1989 National Convention Record of The Institute of Electrical Engineers of Japan.

* cited by examiner

*Primary Examiner*—Karen Masih
(74) *Attorney, Agent, or Firm*—Sughrue Mion, PLLC

(57) ABSTRACT

A vector control device of a winding field type synchronous machine with which even when voltage changes caused by resistance voltage falls and inductance fluctuations due to armature current occur the armature voltage is controlled exactly to a desired command value and a high power supply utilization percentage is maintained at all times. An absolute value of armature voltage is calculated from an armature voltage command value or an armature voltage detected value, and the armature voltage is controlled by a flux command being regulated so that this absolute value of armature voltage approaches a desired armature voltage command value. Also, the armature voltage command value is regulated so that the loss of the synchronous machine becomes minimal with reference to the armature current and the field current.

4 Claims, 5 Drawing Sheets

1: SYNCHRONOUS MACHINE
2: THREE-PHASE DRIVE CIRCUIT
3: D.C. DRIVE CIRCUIT
4: ARMATURE CURRENT SENSOR
5: FIELD CURRENT SENSOR
6: ROTOR POSITION SENSOR
7: FLUX CALCULATOR
8: ARMATURE CURRENT CONTROLLER
10: FLUX CONTROLLER
12: FIELD CURRENT CONTROLLER
13: CALCULATOR
15: VOLTAGE CONTROLLER

19: GAIN
20: ADDER
21: CONTROLLER

VECTOR CONTROL DEVICE OF WINDING FIELD TYPE SYNCHRONOUS MACHINE

BACKGROUND OF THE INVENTION

1. Field of the Invention

This invention relates to a vector control device of a winding field type synchronous machine in which a field-magnet field is created by a field winding on a rotor.

2. Description of the Related Art

In vector control of winding field type synchronous machines, as shown in for example Non-Patent Document 1 below, a vector control method in which control is performed so that an armature interlinkage flux and an armature current intersect orthogonally has been used as a high efficiency, high power factor control method. In a vector control device of related art of this kind, to prevent saturation of the armature voltage occurring as a result of increasing of the induced voltage accompanying increasing of the speed of rotation, as shown in FIG. 3 of Non-Patent Document 1, so-called weak flux control in which, with reference to a motor speed ωm, at above a predetermined speed a flux command Φa* is reduced in inverse proportion to the speed, and by this means at above the predetermined speed the armature voltage is kept constant.

This is because in related art control devices of winding field type synchronous machines, voltage drop due to resistance has been ignored. However, in synchronous machines driven at low voltages and high currents, like winding field type synchronous machines for use in automotive vehicles, the proportion of the armature voltage constituted by voltage drop due to resistance may be large. In this case, the armature voltage fluctuates greatly not only with the flux but also with the armature current. As means for resolving this issue, for example technology set forth in Patent Document 1 below has been disclosed. In the technology disclosed in Patent Document 1, when an armature voltage command has risen above a predetermined value the flux command is corrected.

And, in a winding field type synchronous machine, because currents flow through both an armature winding and a field winding, a loss occurs in both windings. Consequently, to maximize the efficiency of a winding field type synchronous machine, it is necessary to optimize the currents flowing through both of the windings. As means for resolving this issue, for example technology set forth in Patent Document 2 below has been disclosed. In the technology disclosed in Patent Document 2, from a torque command and the speed of the synchronous machine supplied to the control device, armature current command values for a field flux direction (d axis) and a direction orthogonal to that (q axis), and a field flux command value, such that the efficiency is maximum in that operating state, are obtained from tables. Similar technology is also disclosed in Patent Document 3 below, and in Patent Document 3 a field current command is obtained from a table instead of a field flux command.

Non-Patent Document 1: "Vector Control of Synchronous Machine", Hiroshi OSAWA, at S.8–19, 1989 National Convention Record of The Institute of Electrical Engineers of Japan Patent Document 1: Japanese Patent Publication No. 2856950 ([0004] to [0015], FIG. 1)

Patent Document 2: JP-A-8-331900 ([0046] to [0047], FIG. 14)

Patent Document 3: JP-A-11-313498 ([0035] to [0038], FIG. 5)

In a vector control device of a winding field type synchronous machine of related art, when the armature voltage command has risen above a predetermined limit value the flux command is corrected and the armature voltage is limited, and when the armature voltage command does not exceed the predetermined value the armature voltage remains below the predetermined limit value without the flux command being corrected. On the other hand, in a case where as shown in Patent Document 1[0004] to [0009] a current command is calculated from a flux command using a motor constant of the synchronous machine, when due to magnetic saturation or the like there is a difference between the set value and the actual value of the motor constant, it may happen that the flux corresponding to the flux command cannot be created. In particular, when the set value of inductance is greater than the actual value, there has been the problem that the actual flux is low with respect to the flux command and as a result the armature voltage falls and the ratio of the armature voltage to the armature power supply voltage (i.e. the percentage power supply utilization) is low.

On the other hand, in a vector control device of a winding field type synchronous machine of related art, as mentioned above, command values of a d-axis current, a q-axis current and a field are obtained with reference to tables using a torque command and a speed, and the data of these tables is created in advance by calculation using characteristic parameters of the synchronous machine that is the control object, for example as set forth in [0037] to [0046] of Patent Document 1. However, these current command values at which the efficiency of the synchronous machine is maximal vary with fluctuations in the winding resistances with motor temperature and the usable power supply voltage, and in preparing tables of current command values corresponding to these factors there have been the problems that the amount of data is large and storing it in the control device is not easy, and that a great deal of labor is needed for their creation.

SUMMARY OF THE INVENTION

This invention was made to resolve the foregoing problem points, and it is an object of the invention to provide a vector control device of a winding field type synchronous machine that can control the armature voltage exactly and maintain a high power supply utilization percentage at all times even in a synchronous machine driven with a low voltage and a high current in which the proportion of the armature voltage constituted by voltage drop due to resistance is large and fluctuations of motor constants are large.

It is another object of the invention to provide a vector control device of a winding field type synchronous machine with which optimization of the currents flowing through both windings carried out to maximize the efficiency of the winding field type synchronous machine while it is operating can be carried out without reference to tables of current command values.

In a vector control device of a winding field type synchronous machine according to the invention, an armature voltage absolute value is computed from armature voltage command values or armature voltage detected values, and a flux command of the vector control device is regulated to control the armature voltage so that the armature voltage absolute value approaches a desired armature voltage command value.

Consequently, in a vector control device of a winding field type synchronous machine according to the invention, because the flux command is regulated so as to make an armature voltage absolute value approach a desired armature voltage command value, even when voltage changes caused by resistance voltage drops due to armature current and inductance fluctuations occur, it is possible to control the armature voltage exactly to a desired command value and maintain a high power supply utilization percentage at all times.

And, in a vector control device of a winding field type synchronous machine according-to the invention, with reference to an armature current and a field current the armature voltage command is manipulated so that the loss in the synchronous machine is minimized.

And, in a vector control device of a winding field type synchronous machine according to the invention, with-reference to the armature current or the power of a d.c. power supply of an a.c. power convertor connected to the armature winding, and to the field current or the power of a d.c. power supply of a d.c. power convertor connected to the field winding, the flux command is manipulated so that the loss in the synchronous machine is minimized.

Consequently, with a vector control device of a winding field type synchronous machine according to the invention, because a voltage command generator or a flux command generator for regulating a voltage command or a flux command so that the efficiency of the synchronous machine is maximal is provided, it is possible to regulate the current command values in correspondence with the load state and thereby realize operation at maximum efficiency without referring to tables.

The foregoing objects and other objects, features, aspects and advantages of the present invention will becomes more apparent from the following detailed description of the present invention when taken in conjunction with the accompanying drawings.

DETAILED DESCRIPTION OF THE PREFERRED EMBODIMENTS

Preferred Embodiment 1

Figure 1:
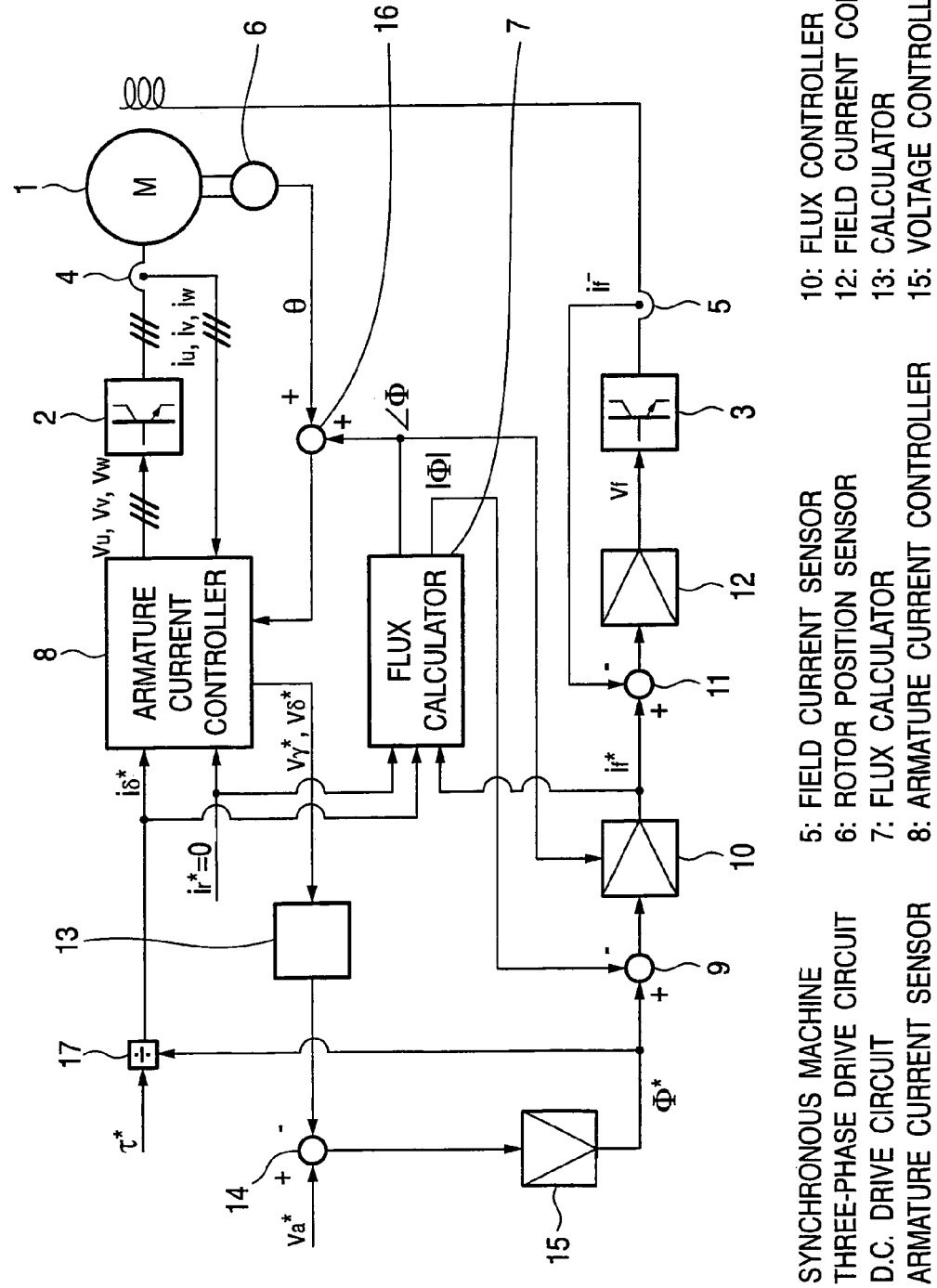
FIG. 1 is a schematic view of a vector control device of a winding field type synchronous machine according to a first preferred embodiment of the invention.

FIG. 1 is a schematic view showing a vector control device of a winding field type synchronous machine according to a first preferred embodiment of the invention. This control device has the function of controlling an armature voltage of a synchronous machine to a desired value. The synchronous machine 1 has an armature winding connected to a three-phase drive circuit 2 and a field winding connected to a d.c. drive circuit 3, and the currents passing through the respective windings are detected by an armature current sensor 4 and a field current sensor 5. A rotor phase, θ of the synchronous machine 1 is detected by a rotor position sensor 6.

A flux calculating part 7 calculates an absolute value |Φ| of armature linkage flux and a flux phase ∠Φ seen from the rotor phase θ, from armature current commands iγ*, iδ* and a field current command if*. Current control of the armature is carried out on two axes, in the direction of the armature interlinkage flux phase (γ axis) calculated by an adder 16 and a direction orthogonal to that (δ axis), and an armature current control part 8 performs current control computation so that armature currents iu, iv, iw approach the desired armature current command values iγ*, iδ* on the γ and δ axes, and output voltage commands vu*, vv* and vw* to the three-phase drive circuit 2. An adder 9 calculates a flux error by subtracting the absolute value |Φ| of armature linkage flux outputted from the flux calculating part 7 from the flux command Φ*, and a flux controller 10 calculates the field current command if* from this flux error and the flux phase ∠Φ. An adder. 11 calculates a field current error by subtracting the field current if– from the field current command if*, and this error is inputted to a field current controller 12 which calculates a field voltage command vf and outputs it to the d.c. drive circuit 3. Because the operations of the parts of the control device discussed above are the same as those of the related art vector control device of a synchronous machine shown in Non-Patent Document 1, they will not be described here in detail.

In the vector control device of a winding field type synchronous machine of the present invention, control of the armature voltage based on a line voltage command va* is carried out. A calculator 13 uses the following expression (1) to calculate an effective line voltage value va of the armature voltage from the voltage command values vγ*, vδ* on the γ and δ axes outputted by the armature current control part 8.

$$v_a = \sqrt{(v_\gamma^*)^2 + (v_\delta^*)^2} \tag{1}$$

An adder 14 obtains a line voltage error by subtracting the effective line voltage value va (equivalent to the armature voltage absolute value) from the line voltage command va*, from this error a voltage controller 15 calculates and outputs the flux command value Φ*, and a voltage control part is thereby constructed so that the effective line voltage value va is controlled to approach the line voltage command va*. A divider 17 calculates a δ-axis current command iδ* by dividing a torque command τ* by the flux command value Φ*, and the δ-axis current command iγ* is set to 0. The voltage controller 15 is for example an integrator or a PI controller, and a limiter for limiting the range of the output flux command may be added to this.

As the line voltage command va* a desired value may be supplied in accordance with the application, and for example a value can be determined with reference to a d.c. bus voltage of the three-phase drive circuit 2, or in the case of a machine using a d.c. power supply such as a battery, it maybe determined with reference to the voltage of that d.c. power supply. By adopting this kind of construction it is possible to maintain a high power supply utilization rate irrespective of the armature current, and it is possible to cope easily even when the power supply voltage fluctuates.

Although in the foregoing preferred embodiment an application to the case of a control system using control axes based on the armature interlinkage flux was described, the invention can also of course be applied similarly to a control system using control axes with the rotor axis as a reference.

Now, in a synchronous machine in a steady running state controlled at power factor 1, when the armature linkage flux and the control axis (γ axis) coincide, the γ and δ axis voltages vγ, vδ are given by expression (2). Here, ω is the speed (electrical angle) of the synchronous machine and r is the armature resistance.

$$\begin{cases} v_\gamma = 0 \\ v_\delta = \omega|\Phi| + r \cdot i_\delta \end{cases} \quad (2)$$

From expression (2) it can be seen that when the control axis and the armature interlinkage flux coincide, the γ-axis voltage becomes 0. From this, as the calculation of the calculator 13, the same effect can be obtained by simply using the absolute value of the δ-axis voltage command vδ* instead of expression (1) And even when the γ-axis voltage command vγ* is not 0 because of axis deviation or the like, because vδ*>>vγ*, by using the following expression it is possible to obtain the effective line voltage value va approximately.

$$v_a = v_\gamma + \frac{v_\delta^2}{2v_\gamma} \quad (1')$$

Thus, in the case of a control system using control axes with the armature interlinkage flux as a reference, there is the merit that the voltage computation becomes simple.

As can be seen from expression (2), the degree to which the line voltage changes with changes in the armature interlinkage flux is proportional to the speed ω. Consequently, when the gain of the voltage controller is kept constant, the response of the voltage control circuit changes with the speed. This can be prevented by the gain of the voltage controller being changed in correspondence with the speed (for example made to change in inverse proportion to the speed), whereby more stable operation can be realized.

Whereas in the foregoing preferred embodiment the line voltage of the armature was obtained from the voltage commands of the armature voltage control part, alternatively the line voltage may be obtained by measuring the actual terminal voltage of the synchronous machine, whereby the same effects can be expected. And, the content of the present invention is not limited to the constructions of the armature current control part, the flux computation part, and the field current control part used in the first preferred embodiment, and the same effects can of course be obtained with vector control devices of other constructions having flux commands.

Second Preferred Embodiment

Figure 2:
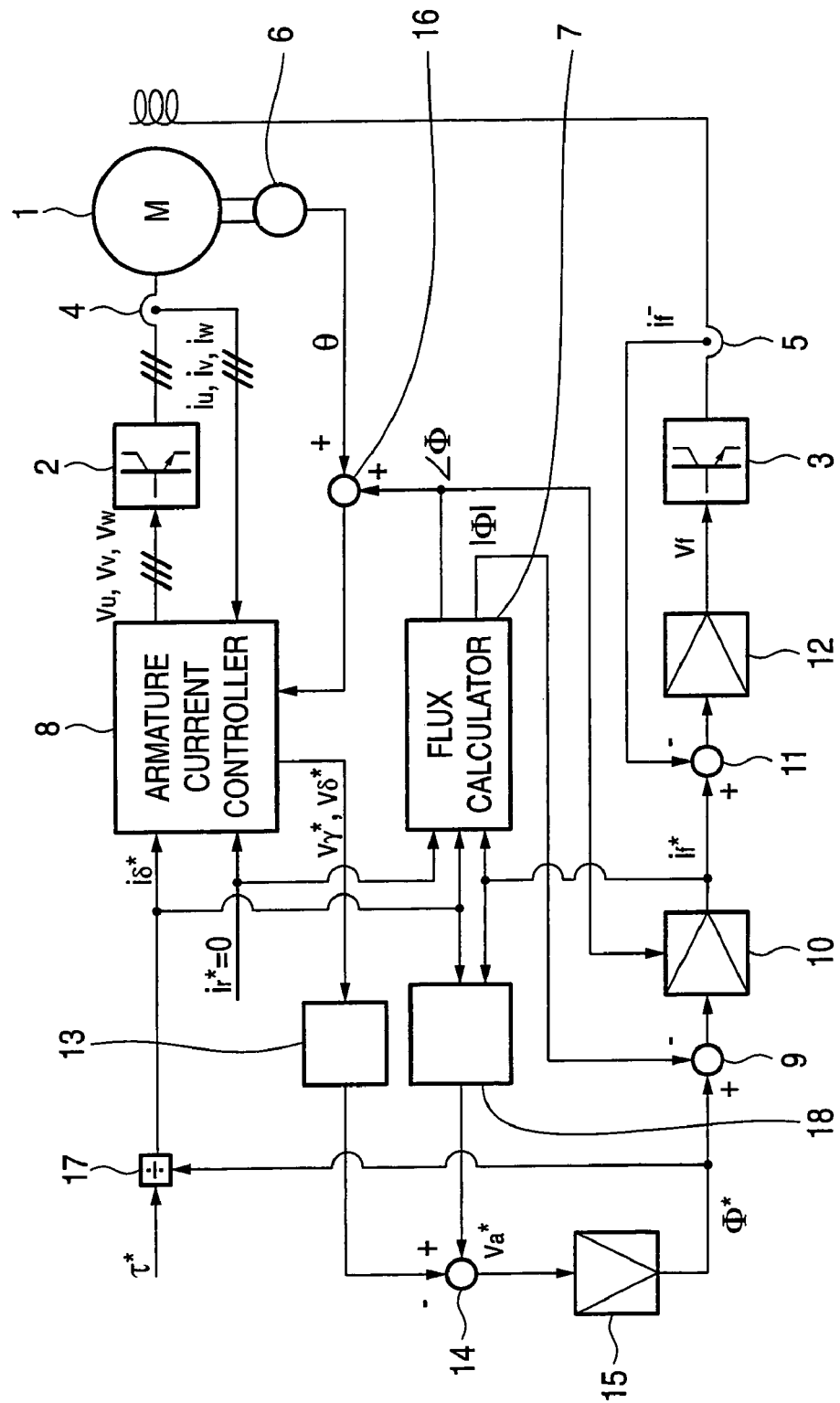
FIG. 2 is a schematic view of a vector control device of a winding field type synchronous machine according to a second preferred embodiment of the invention.

FIG. 2 is a schematic view showing a vector control device of a winding field type synchronous machine according to a second preferred embodiment. This control device has the function of improving the efficiency of the synchronous machine at light loads. In the figure, 1 to 17 are the same as in the first preferred embodiment. A voltage command generator 18 calculates the loss of the synchronous machine from the armature current command iδ* and the field current command if* and generates a voltage command va* such that this loss becomes minimal. Here, the principle of operation of reducing loss by manipulating the voltage command will be explained. The torque τ of a synchronous machine running at power factor 1 is given by expression (3).

$$\tau = i_\delta \cdot |\Phi| \quad (3)$$

Figure 3:
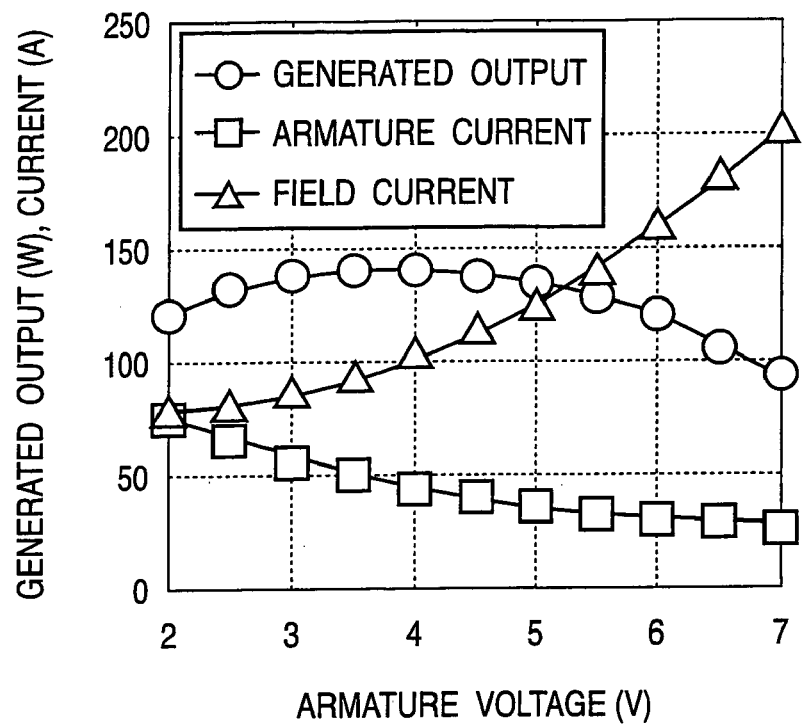
FIG. 3 is a chart illustrating experimental results showing how output and armature current and field current change with armature voltage in a synchronous machine at constant torque.

From expression (3), it can be seen that it is possible to generate the same torque τ from different combinations of the armature current iδ and the armature linkage flux absolute value |Φ|. As can be seen from expression (2), the armature linkage flux absolute value |Φ| can be changed by manipulating the armature voltage va, and following that the field current if changes. FIG. 3 is a chart of experimental results showing changes with armature voltage of the output and armature and field currents of a synchronous machine when the shaft work input is constant at 186 W, i.e. at constant torque. From FIG. 3, it can be seen that with increase of the armature voltage the armature current decreases and the field current increases, and that the generator output changes with the armature voltage and there is an armature voltage at which the generator output is maximal. At the running point of this maximum generator output, the efficiency of the synchronous machine is maximal and its loss is minimal. When only the copper losses of the armature winding and the field winding are considered as the loss of the synchronous machine, that loss $P_{loss}$ can be expressed as shown in expression (4). Here, $r_f$ is the field resistance.

$$P_{loss} = r \cdot i_\delta^2 + r_f i_f^2 \quad (4)$$

The voltage command generator 18 calculates the loss using for example expression (4), and manipulates the armature voltage va so that this loss becomes minimal. Specifically, an operation is carried out such as changing the voltage command va* by a predetermined amount upward or downward from the present value and updating the command value in the direction in which the loss becomes lower and searching for the command value at which the loss is minimal. Because as a result of the restriction on the armature voltage there is a limit on the va* that can be set, the output of the voltage command generator 18 may be limited by that restriction. Although in the foregoing description only copper losses were considered as the loss of the synchronous machine, the loss calculation may alternatively be performed taking into account other losses such as iron loss, and in this case the voltage command generator 18 is constructed to refer to information such as the speed of the synchronous machine besides the current values.

It is clear that the same effects can be obtained by adopting a construction wherein instead of the armature current and the field current, measured values of the powers or the currents inputted/outputted to/from the three-phase drive circuit and the d.c. drive circuit are inputted to the voltage command generator, and the voltage command generator regulates the voltage command to be minimal when these currents or powers are being inputted (when the synchronous machine is working as a motor) and maximal when they are being outputted (when the synchronous machine is working as a generator).

Figure 4:
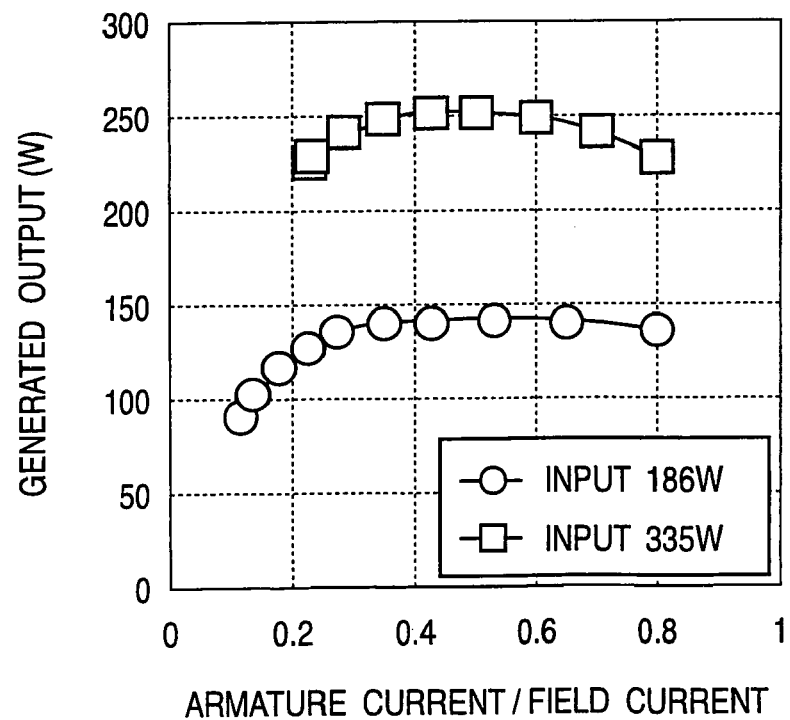
FIG. 4 is a chart illustrating experimental results showing a relationship between the ratio of armature current to field current and generated power.

The loss-minimizing condition discussed above can also be obtained on the basis of other conditions, without performing the kind of loss calculation described above. In FIG. 4, the experimental results shown in FIG. 3 have been rearranged into a relationship between the ratio of the armature current to the field current and the generated output and shown on a graph along with results for the case of a different shaft work input (335 W). From FIG. 4 it can be seen that in the case of these experimental conditions, at either input the generated output is maximal when the ratio of the armature current to the field current is about 0.5. Because as shown in FIG. 3 in a synchronous machine controlled at power factor 1 it is possible to change the ratio of the armature current to the field current by manipulating the armature voltage, it is possible to operate the synchronous machine in a minimal loss condition by controlling the armature voltage to a desired value.

Here, the phenomenon shown in FIG. 4 will be investigated theoretically. In a synchronous machine operated at power factor 1, the armature linkage flux absolute value |Φ| is given by the following expression.

$$|\Phi| = L\sqrt{\left(\frac{M}{L}\right)^2 i_f^2 - i_\delta^2} \quad (5)$$

Here, L is the self-inductance of the armature winding, M is the mutual inductance of the field winding and the armature winding, and it is assumed that the self-inductance of the armature winding does not change with the rotor position, that is, that there is no saliency of L. As mentioned above, the torque is given by expression (3) and the loss of the synchronous machine by expression (4). At this time, the torque/loss ratio ε, which is the ratio of torque to loss, is given by the following expression.

$$\varepsilon = \frac{\tau}{P_{loss}} = \frac{L}{r} \cdot \frac{\sqrt{\left(\frac{M}{L}\right)^2 k - 1}}{1 + \frac{r_f}{r}k} \quad (6)$$

$$ただし、k = \left(\frac{i_f}{i_\delta}\right)^2$$

At the k=$k_{opt}$ at which the this torque/loss ratio s is maximal, the value obtained by partially differentiating the torque/loss ratio ε with k becomes 0, and the rearranging the equation of this condition yields the following expression.

$$k_{opt} = \frac{2 + \varsigma\frac{r}{r_f}}{2\varsigma - 1} \quad ただし、\varsigma = \left(\frac{M}{L}\right)^2 \quad (7)$$

As can be seen in expression (7), at the condition where the torque/loss ratio is maximal, i.e. the loss is minimal, the synchronous machine is being run at the ratio of the armature current to the field current equivalent to the k obtained with expression (7).

In an actual synchronous machine, due to affects of saliency of L and iron losses, the point of minimum loss does not exactly coincide with the condition of expression (7), but because as shown in FIG. 4 the fluctuation in loss is relatively gentle near the running point of minimum loss, by running the synchronous machine at a current ratio near to the running point obtained with expression (7) it is possible to realize operation that is sufficiently close to minimum-loss in practice.

Figure 5:
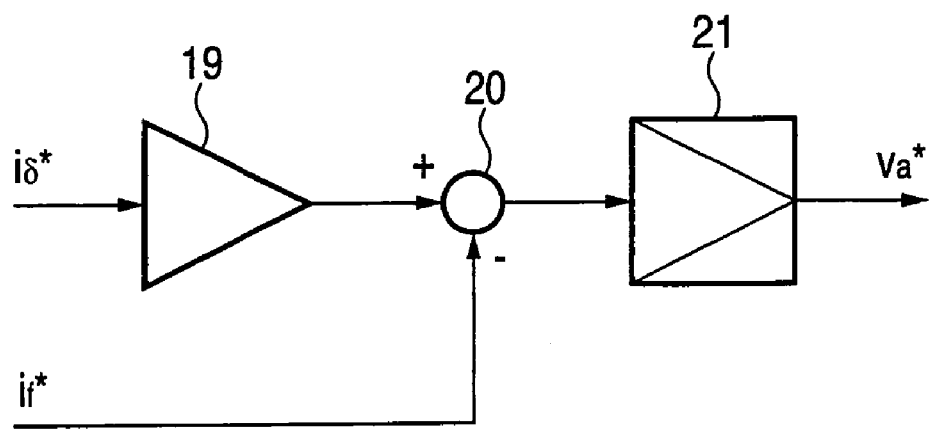
FIG. 5 is a schematic view showing a voltage command generator in the second preferred embodiment.

FIG. 5 shows the construction of a voltage command generator in a case where the operation described above is carried out. The δ-axis current command iδ* corresponding to the armature current is amplified by a gain 19, and the size of this gain 19 for example may be a value equivalent to the square root of the $k_{opt}$ at the above-mentioned time of minimum loss or may be a predetermined current ratio decided on the basis of actual measurement. The difference between the gain-multiplied δ-axis current command iδ* and the field current command if* is calculated by an adder 20. A controller 21 performs an operation on this difference and thereby calculates and outputs a line voltage command va* and by this means performs control so that the ratio of the armature current to the field current approaches the value of the gain 19, and is for example an integrator or a PI controller.

Because as can be seen from expression (2) and expression (5) the degree to which the field current changes when the line voltage command is changed is inversely proportional to the speed, the gain of the controller 21 may be made proportional to the speed, and when this is done it is possible to perform stable control of the current ratio without being affected by the speed. In a synchronous machine in which flux from permanent magnets is also used as the field flux, because the relationship between the flux and the current differs from that of expression (5) it is not possible to apply a current ratio based on expression (7) directly; however, by considering the permanent magnet flux as an equivalent field current and adjusting a value obtained by adding this equivalent field current corresponding to the permanent magnets to the actual field current to the desired current ratio, it is possible to operate the synchronous machine at a state close to minimum-loss by approximation.

Third Preferred Embodiment

Figure 6:
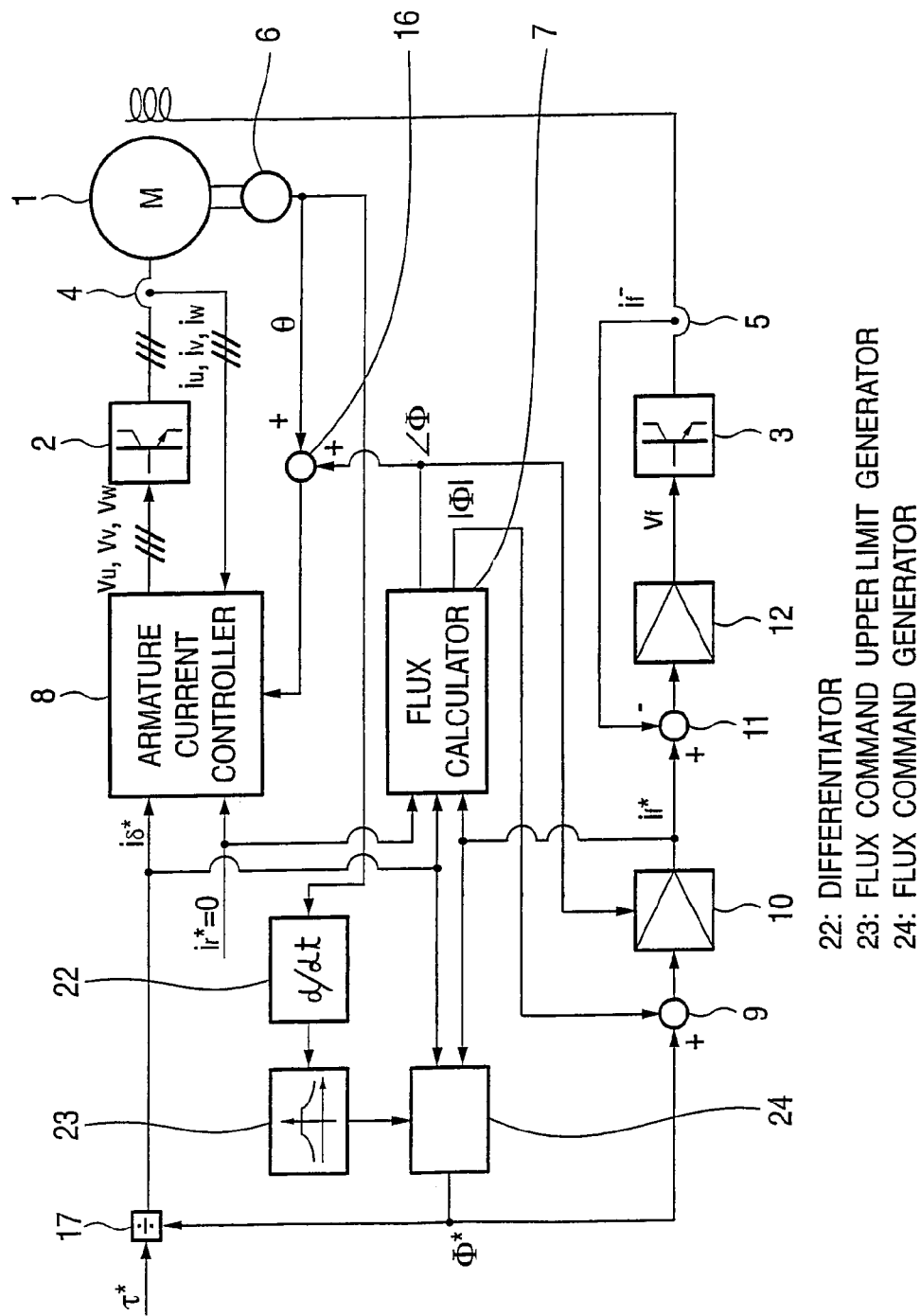
FIG. 6 is a schematic view showing a vector control device of a winding field type synchronous machine according to a third preferred embodiment.

FIG. 6 is a schematic view showing a vector control device of a winding field type synchronous machine in a third preferred embodiment. This control device is one obtained by adding a function of improving efficiency at light loads to a related art control device of a synchronous machine that does not perform voltage control. In the figure, 1 to 17 are the same as in the first preferred embodiment. A flux command generator 24 calculates the loss of the synchronous machine from an armature current command iδ* and a field current command if*, and generates a flux command Φ* such that this loss is minimal. Because it is self-evident from expression (2) that by manipulating the flux of the synchronous machine it is possible to manipulate the armature voltage, it is possible to realize the same minimum-loss operation as in the second preferred embodiment by manipulating the flux command Φ*.

The flux command generator 24 performs an operation of searching for the flux command at which the loss of the synchronous machine is minimal, as in the second preferred embodiment, or an operation of manipulating the flux command so that the armature current and the field current assume a predetermined ratio, as in FIG. 5. When the latter approach is used, because the change in field current with changing of the flux command is approximately proportional, it is not necessary for the gain of the controller to be made proportional to the speed as described with reference to the second preferred embodiment. Alternatively the flux command generator 24 described above may be provided in the first preferred embodiment, the loss of the synchronous machine calculated from the armature current command iδ* and the field current command if*, and a flux command Φ* generated such that this loss is minimal.

A differentiator 22 differentiates the rotor phase θ to obtain the speed of the synchronous machine, a flux command upper limit generator 23 obtains a maximum value of the flux command determined on the basis of the speed, and on the basis of this value the flux command generator 24 restricts the value of the flux command Φ* that it generates. The output of the flux command upper limit generator 23 is similar to the flux command value determined with reference to the speed in control devices of related art shown in Non-Patent Document 1 and elsewhere, and is set to prevent saturation of the armature voltage.

While presently preferred embodiments of the present invention have been shown and described, it is to be understood that these disclosures are for the purpose of illustration only and that various changes and modifications may be made without departing from the scope of the invention as set forth in the appended claims.

What is claimed is:

1. A vector control device of a winding field type synchronous machine, the vector control device comprising:
    a voltage calculator which calculates an absolute value of an armature voltage from an armature voltage command value or an armature voltage detected value; and
    a voltage controller which generates a flux command to control the armature voltage so that the absolute value of the armature voltage approaches a desired armature voltage command value.

2. A vector control device of a winding field type synchronous machine, the vector control device comprising:
    a voltage calculator which calculates an absolute value of an armature voltage from an armature voltage command value or an armature voltage detected value;
    a voltage controller which generates a flux command to control the armature voltage so that the absolute value of the armature voltage approaches a desired armature voltage command value; and
    a voltage command generator which generates the armature voltage command to minimize a loss of the synchronous machine with reference to an armature current and a field current.

3. A vector control device of a winding field type synchronous machine, the vector control device comprising a flux command generator which generates a flux command to minimize a loss of the synchronous machine with reference to an armature current and to a field current.

4. A vector control device of a winding field type synchronous machine, the vector control device comprising a flux command generator which generates a flux command to minimize a loss of the synchronous machine with reference to a power of a d.c. power supply of an a.c. power convertor connected to an armature winding and to a power of a d.c. power supply of a d.c. power convertor connected to a field winding.

* * * * *